United States Patent Office 3,661,857
Patented May 9, 1972

3,661,857
POLYMERIC COMPOSITIONS
Al F. Kerst, Littleton, Colo., assignor to Monsanto Company, St. Louis, Mo.
No Drawing. Filed Apr. 13, 1970, Ser. No. 28,032
Int. Cl. C08g 22/16, 51/54; C08f 45/54
U.S. Cl. 260—75 NR    6 Claims

ABSTRACT OF THE DISCLOSURE

A polymer comprising a reactive hydrogen containing material such as polyurethane, copolymerized with substituted epoxy ethane polyphosphonate having the formula

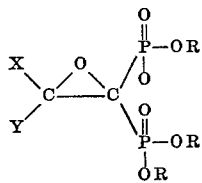

wherein R is hydrogen or an organic radical and X and Y are hereinafter defined.

---

This invention relates to organic polymeric compositions and, more particularly, provides novel polymeric compositions having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general.

An additional object of this invention is to provide in polymer compositions an organic phosphorus compound having reduced tendency to decompose and/or degrade from the polymer compositions when the polymer system is subjected to elevated temperatures.

Other objects, advantages, and aspects of this invention will become apparent from a reading of the specification and the appended claims.

This invention provides, as new compositions of matter, an organic synthetic polymer (linear or cross-linked) in combination with a substituted epoxy ethane polyphosphonate as defined herein.

Another aspect of this invention provides, as new compositions of matter, synthetic copolymeric materials prepared using as a comonomer a substituted epoxy ethane polyphosphonate as defined herein.

A still further aspect of this invention provides a method for reducing the tendency or organic synthetic polymers to burn after a source of burning heat has been removed from the polymeric composition by incorporating into the organic synthetic polymeric compositions a substituted epoxy ethane polyphosphonate as defined herein.

It has been found that certain organo-phosphorus compounds, i.e., substituted epoxy ethane polyphosphonates, corresponding to the following formula

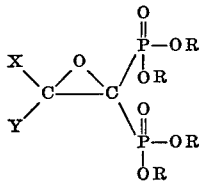

can be added to, blended with, or co-polymerized with the synthetic polymeric materials to accomplish the above stated objects and aspects.

In the above Formula I, X and Y are each alike or unlike and are from the group hydrogen, alkyl containing from 1 to 30 (preferably 1 to 8 and more preferably 1 to 4) carbon atoms (including branch and straight chain members), phenyl, halogen (preferably chlorine, bromine, fluorine and iodine) substituted phenyl,

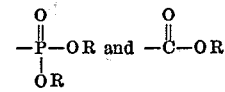

wherein R is hereinafter defined.

In Formula I, R is from the group hydrogen, alkyl, alkenyl, aryl, alkyl aryl, cyclic and alicyclic.

In conjunction with the foregoing general Formula I and more specifically when the substituted epoxy ethane polyphosphonate is in the ester form thereof, i.e., R is an organic radical heretofore mentioned, the preferred substituents are the following:

(a) alkyl—containing from about 1 to about 8 carbon atoms;
(b) alkenyl—containing from about 1 to about 18 carbon atoms;
(c) aryl—phenyl, naphthyl, anthryl, or phenanthryl;
(d) alkyl aryl (alkaryl)—hydroxy, halogen, lower alkyl, having from 1 to about 6 carbon atoms, and amino substituted phenyl, naphthyl, anthryl, or phenanthryl;
(e) cyclic—containing from about 4 to about 8 carbon atoms and there may be present in the ring either a nitrogen, sulfur, oxygen or phosphorus atom; and
(f) alicyclic—containing from about 4 to about 10 carbon atoms.

It is to be understood that all of the compounds falling within the above Formula I and as heretofore defined are generically described herein as "epoxy ethane polyphosphonates" or "EEPP." In other words, then, the acids and esters and mixtures thereof are all generically described herein as epoxy ethane polyphosphonates or EEPP.

In conjunction with the generic Formula I, this includes, without limitation, the following sub-generic formulae:

(II)

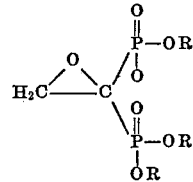

(III)

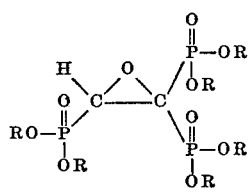

(IV)

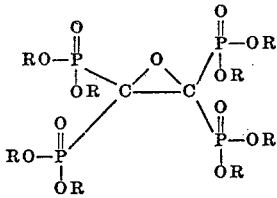

(V) 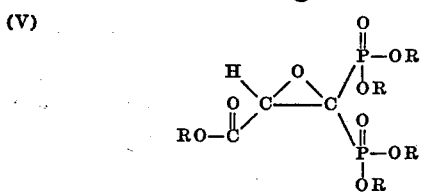

(VI) 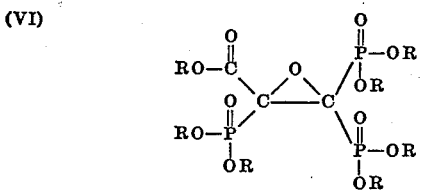

(VII) 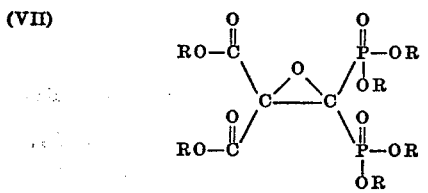

(VIII) 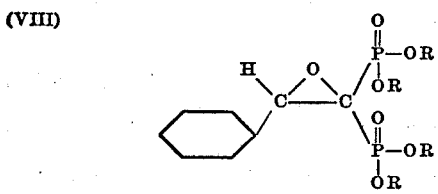

(IX) 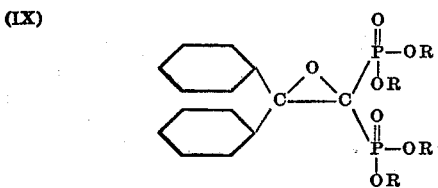

(X) 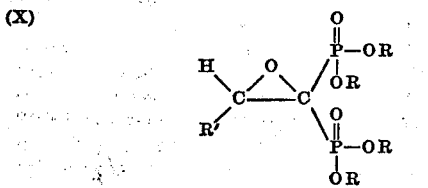

(XI) 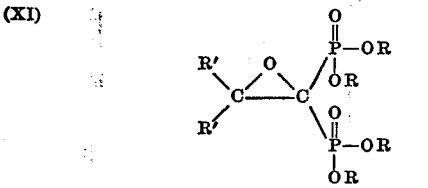

In the above Formulae X and XI R' is an alkyl group containing from 1 to 30, preferably 1 to 8 and more preferably 1 to 4, carbon atoms. It is to be understood that R' includes straight and branched chain lengths and isomers.

As illustrative of the epoxy ethane polyphosphonates which fall within the above Formula I, there may be mentioned without limitation, the following compounds:

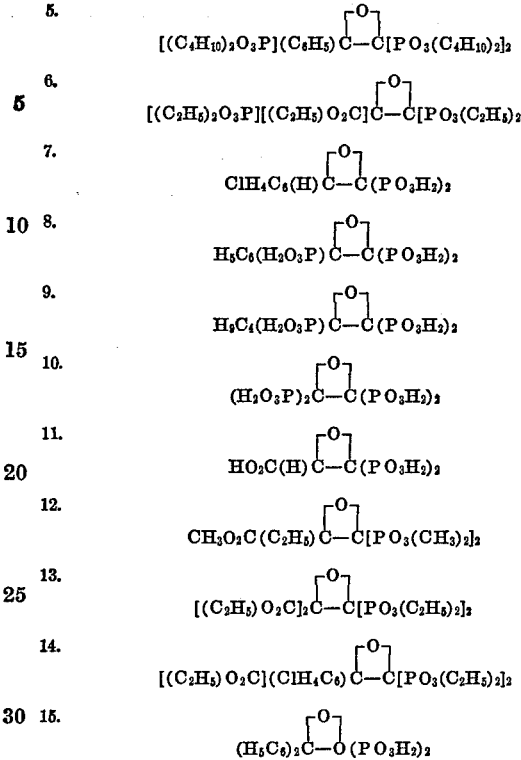

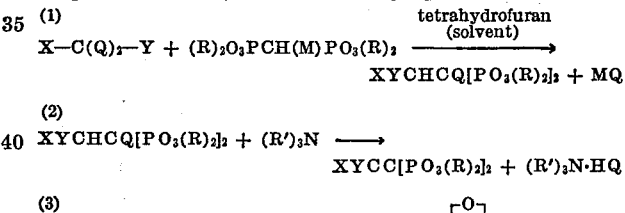

In general, the epoxy ethane polyphosphonates can be prepared according to the following equations:

(1) $X-C(Q)_2-Y + (R)_2O_3PCH(M)PO_3(R)_2 \xrightarrow[\text{(solvent)}]{\text{tetrahydrofuran}}$
$XYCHCQ[PO_3(R)_2]_2 + MQ$ (2) $XYCHCQ[PO_3(R)_2]_2 + (R')_3N \longrightarrow$
$XYCC[PO_3(R)_2]_2 + (R')_3N \cdot HQ$ (3) $XYCC[PO_3(R)_2]_2 \xrightarrow{\text{Peroxy compound}} XYC\overset{\displaystyle\lceil O\rceil}{\underset{\displaystyle}{-}}C[PO_3(R)_2]_2$ In the above equations, X and Y and R are the same as herein defined; (R')₃N represents a tertiary amine such as triethyl amine; M represents a metal ion such as sodium; and Q represents a halogen such as chlorine; and the peroxy compound may be from the group organic hydroperoxide, hydrogen peroxide, organic per acids or mixtures thereof.

In carrying out the aforementioned reactions as represented by Equations 1, 2 and 3, generally the reaction can be conducted at temperatures between about 0° C. and 100° C., and preferably from about 15° C to about 75° C. It is also within the scope of these processes to utilize atmospheric, sub-atmospheric (e.g., ½ to 760 mm. Hg.) or super-atmospheric (e.g., up to 10 atmospheres) pressure. In the above Equations 1 and 2, respectively, the by-product precipitates, MQ and (R')₃N·HQ, are preferably removed (e.g., by conventional means such as filtration, decantation and the like) before the reactions are carried out, respectively, in Equations 2 and 3.

The presently provided epoxy ethane polyphosphonates are useful as modifiers as well as flame retardants for synthetic polymeric materials. These epoxy ethane polyphosphonates may be used in a quantity which is equal to that of the polymer, but in most instances favorable results with respect to improvement in flame retardance are obtained at concentrations which are definitely lower. In some cases amounts as little as 0.1% by weight of polymer and EEPP, may be used, although generally it is preferred that amounts of from about 1% to 50% be used to provide polymeric systems with reduced burning rates. Use of the present EEPP with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence in order to arrive at optimum beneficial effect suited to the purposes for which the polymeric composition is designed, only routine testing, involving variation of adjuvant quantity is generally required, although in some instances one or more members of the whole class of the presently provided EEPP will be found to impart a degree of modification at a low concentration which can be attained by other memebrs of the class at significantly higher concentrations.

The flammability test for measuring the burn qualities of polymer samples is for the most part essentially the standard burn test known as ASTM–D1692–D59T (which is incorporated herein by reference) or modifications thereof. As used herein a polymeric composition is considered "non-burning" if there is no evidence of burning (flame or progressive glow) after removal of the burner and a self-extinguishing" sample is one that continues to burn after removal of the burner but the flame goes out before the second gauge line is reached.

In general, EEPP can be used as a comonomer in place of or in combination with conventionally used dibasic or polybasic carboxylic anhydrides, such as phthalic and maleic anhydride, to form synthetic polymeric systems. The EEPP, for example, can undergo reactions with reactive hydrogen-containing materials which include polyamines containing at least two amine groups with a reactive hydrogen on each group and polyhydroxyl-containing organic compounds (containing at least two hydroxyl groups with a reactive hydrogen on each group) including polyhydric alcohols, phenols and the like. A distinct advantage of the present invention, therefore, is the flexibility which the EEPP exhibits in formulating and preparing polymeric compositions. For example, they can be used with preformed monomers, copolymers and the like, or they can be used as a comonomer to form polymers with other appropriate monomer materials.

In general, the polyhydric alcohols which are useful in preparing polymers by reaction with the EEPP include glycerol, pentaerythritol (including di- and tri-pentaerythritol), sorbitol, mannitol, and the glycols (including the alkylene glycols and the polyalkylene glycols in which the alkylene group is (—CH$_2$—)$_n$ wherein $n$ is an integer from 2 to 10), such as ethylene glycol, propylene glycol, butylene glycol, diethylene glycol, dipropylene glycol, triethylene glycol, tetraethylene glycol, hexamethylene glycol decamethylene glycol and the like.

In general, the polyamines which are useful in preparing polymers by reaction with the EEPP include the alkylene polyamines (particularly the alkylene diamine, triamine, and tetraamines in which the alkylene group is (—CH$_2$—)$_n$ wherein $n$ is an integer from 2 to 10) such as ethylene diamine, diethylene diamine, hexamethylene diamine, decamethylene diamine, triethylene tetraamine, pentamethylene triamine, hexamethylene tetraamine, butylene diamine, and the like.

Usually all that is necessary is to mix the EEPP and polyamine and/or polyhydric organic compounds, preferably in amounts of about one

(epoxy) group per amine or hydroxyl group, although amounts on an epoxy group to amine or hydroxyl group ratio of from about 1:10 to 10:1 can be used, and heat to elevated temperatures, such as from about 40° C. to the melting point of the reactants (under atmospheric pressure, although sub-atmospheric pressures as well as pressures in excess of atmospheric can be used) with temperatures above about 90° C. being preferred. In addition, it is sometimes advantageous to employ an inert liquid non-aqueous reaction medium such as paraffin hydrocarbons, benzene, toluene, xylene, dioxane, acetone, dimethyl formamide, tetrahydrofuran and the like and after polymerization removing the medium, such as by distillation and/or decantation, in order to recover the polymer.

Synthetic polymeric materials, i.e., those high molecular weight organic materials which are not found in nature, with which the EEPP are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flameproofed hereby consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyano-ethoxy) ethyl 3-(3-cyanopropoxy) propyl acrylate or methacrylate, 2-(diethylamino) ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluorethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinylsuccinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the EEPP. Examples of such copolymers or terpolymers are those obtained by polymerization of the following monomer mixtures: vinyl chlorine-vinyl acetate, acrylonitrile-vinyl pyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α-, β-olefinic dicarboxylic acids and the derivatives thereof such as the anhydrides, esters, amides, nitriles and imides, e.g., methyl, butyl, 2-ethylhexyl or dodecyl fumarate or maleate, maleic chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present EEPP are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present EEPP are also the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxy benzenes, naphthalenes and the like, the dihydroxydiphenyl ethers, sulfones, alkanes [bis (4-hydroxyphenyl)2,2-propane], ketones and the like.

Advantageously modified by the present EEPP are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer of 2-chlorobutadiene - vinylidene cyanide - acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the crosslinked polymeric materials such as methyl methacrylate-diallyl methacrylate copolymer or butadiene-styrene-divinylbenzene terpolymer.

Polymerized materials prepared by subsequent reaction of the performed vinyl polymers, e.g., polyvinyl alcohol, the polyvinyl acetals such as polyvinyl formal or polyvinyl butyral, or completely or partially hydrolyzed polyacrylonitrile are likewise modified in properties by the present EEPP to give polymeric materials of enhanced utility.

Polymeric materials with which the present EEPP can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylene phosphonic acid and styrenephosphonic acids and their salts, esters and amides; the silanes such as dimethylvinylsilane, diphenylvinylsilane and methylphenylvinylsilane, etc.

A class of synthetic polymeric materials with which the present EEPP are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The EEPP may be incorporated into films of such cellulose derivatives by adding them to the solutions from which the films are cast or into the melts from which the fibers are extruded.

The present EEPP are particularly suited to the modification of liquid resin compositions of the polyester type, e.g., the linear polyesters which are obtained by the reaction of one or more polyhydric alcohols with one or more $\alpha,\beta$-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such as 3,4-dichlorostyrene, $\alpha$-chloro-styrene, $\alpha$-methylstyrene; other vinyl-substituted hydrocarbons such as $\alpha$- or $\beta$-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present EEPP are compatible and are advantageously used. These resins are condensation products formed by the reaction of a polyhydroxy compound and epichlorohydrin, which condensation products are subsequently cured by addition of cross-linking agents. The hydroxy compound may be e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present EEPP. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramines, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4 - dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl)ether, etc., and/or aminoalcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or aminoalcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3,2-methylpentanediol-2,4,2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc., dipropylene glycol, tripropylene glycol, trithiopropylene glycol, polypropylene glycols 400, 750, 1,200 and 2,000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene - 1,2 - diisocyanate, butylene - 1,3 - diisocyanate, hexylene - 1,6 - diisocyanate, cyclohexylene - 1,2 - diisocyanate, m-phenylene diisocyanate, 2,4 - toluylene diisocyanate, 2,6 - toluylene diisocyanate 3,3' - dimethyl - 4,4' - biphenylene diisocyanate, 3,3' - dimethoxy - 4,4' - biphenylene diisocyanate, 3,3' - diphenyl - 4,4' - biphenylene diisocyanate, 4,4'-biphenylene diisocynate, 3,3' - dichloro - 4,4' - biphenylene diisocyanate, triphenylmethane triisocyanate, 1,5-napthalene diisocyanate or polyisocyanates in a blocked or inactive form such as the bisphenyl carbamates of toluylene diisocyanate, p,p' - diphenyl - methane diisocyanate, p-phenylene diisocyanate and 1,5 - naphthalene diisocyanate, etc.

For preparation of the flame-retardant polyurethanes, the present EEPP are preferably added to a mixture of the reactants and catalyst before hardening. The hardened molded pieces or foams are rendered flame-retardant by the inclusion therein of the EEPP in quantities of from about 2% to about 25% by weight of the polyurethane. Use of the present EEPP in the polyurethane foams can also, in some applications, improve the mechanical properties of the foams.

Phenolic resins are also beneficially modified by the present EEPP, which compounds can be incorporated into the resin either by milling in molding applications or by addition to film-forming or impregnating and bonding solutions previous to casting. Phenolic resins with which the present EEPP compounds are employed are, for example, the phenolaldehyde resins prepared from phenols such as phenol, cresol, xylenol, resorcinol, 4-butylphenol, 4-phenylphenol, and aldehydes such as formaldehydre, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present EEPP. Examples thereof are the heat-convertible condensation products of an aldehyde with urea, thiourea, guanidine, cyanamide, dicyandiamide, alkyl or aryl guanamines, and the triazines such as melamine, 2-chloro - 4,6 - diamino - 1,3,5 - triazine and 2 - hydroxy-4,6 - diamino - 1,3,5 - triazines. The present adjuvants are compatible with the aminoplasts; and depending upon the quantity of EEPP used, they serve to modify their physical properties as well as to render them fire-retardant. When the aminoplasts are destined for use as impregnating agents, bonding adhesives, coatings and casting of films, the EEPP are incorporated into solutions or suspensions in which the aminoplast is carried. The resulting mixtures give strong, fire-retardant laminates when sheets of paper, glass, cloth or fabric are impregnated therewith and cured.

Also beneficially modified by the present EEPP are the nylons, i.e., the superpolyamides which are generally obtained by the condensation of a diamine, e.g., hexamethylenediamine with a dicarboxylic acid, e.g., adipic acid. Depending upon the quantity of EEPP employed and the individual nature of the compound, there are obtained flame-retardant and/or dye receptor effects.

Other polyamides with which the present EEPP are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenylalanine anhydride; the polymeric lactams, e.g., polycaprolactam, piperidone, 2 - oxohexamethyleneimine and other cyclic amides. The present EEPP can be incorporated into molding or extruding compositions for flame-retardant effect and/or to modify the physical properties of such compositions.

The present EEPP are also advantageously employed as adjuvants for polymeric aldehydes, e.g., homopolymeric, high-molecular weight formaldehyde.

The present EEPP are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4 - aminobutyric acid or 6 - aminocaproic acid; the polyanhydrides which are formed by the self-condensation of dicarboxylic acids such as sebacic acid or adipic acid, etc. The present EEPP are flame retardants for such self-condensation products, generally; and where transparentizing effect and dye receptivity are lacking, the EEPP are often instrumental in ameliorating such deficiencies.

The following examples are presented to illustrate the invention, with parts and percentages by weight being used in the examples unless otherwise indicated. All polymeric compositions illustrated in the following examples will exhibit reduced burning rates and can be classified as either non-burning or self-extinguishing.

EXAMPLE I

A copolymeric composition is obtained by heating about 0.15 mols of ethylene diamine and about 0.4 mol of the above described compound No. 1, i.e.

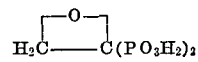

in benzene to about 81° C. for about 4½ hours. The reaction batch is cooled to room temperature and the benzene distilled off yielding a polymeric composition which softens at about 240–275° C.

EXAMPLE II

A copolymeric composition is obtained by blending about 0.3 mol of hexamethylene diamine and about 0.1 mol of an indicated EEPP compound, and heating the mixture for 5 hours at about 164° C. and thereafter cooling to room temperature. The added EEPP compounds are those heretofore described as compounds Nos. 1, 4, 10, 13 and 15.

EXAMPLE III

A copolymeric omposition is also obtained by blending about 0.3 mol of ethylene glycol and about 0.1 mol of an indicated EEPP compound and then heating the mixture at 102° C. for about 2½ hours. Upon cooling to room temperature the composition sets to a solid polymeric composition. The added compounds are those heretofore described as compound Nos. 1, 4, 10, 13 and 15.

EXAMPLE IV

A copolymeric composition is obtained by dissolving about 5.0 parts of

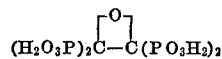

compound No. 11, in about 115 parts of dimethyl formamide at a reflux temperature of about 140° C., and adding about 3.5 parts of hexamethylene diamine to the solution under refluxing. The polymeric composition precipitates from the solution in the form of a solid material and after cooling to room temperature is removed from the dimethyl formamide solution.

EXAMPLE V

A polymeric composition is obtained by blending 4 parts of oleic acid, 27 parts of glycerine, 15 parts of an indicated EEPP compound, and a trace of toluene sulfonic acid and heating the mixture to about 155° C. under a flowing nitrogen blanket sufficient to exclude air and to remove by-product water. After about 45 minutes gelatin occurs and the batch is cooled to room temperature to yield a solid polymeric composition. The added compounds are those heretofore described as compounds 2, 3, 5, 8 and 14.

EXAMPLE VI

This example illustrates the preparation of a rigid polyurethane foam using one of the indicated EEPP therein as the flame retardant.

| Ingredient: | Parts |
| --- | --- |
| Methyl glucoside based polyol | 100.0 |
| Trichloromonofluoromethane | 35.0 |
| "Silicone Y–4316" [1] | 2.0 |
| Tetramethylbutane diamine | 1.5 |
| EEPP [2] | 10.0 |
| Polyisocyanate "Mondur MR" [3] | 108.0 |

[1] "Silicone Y–4316" is a trademark name for a silicon foam stabilizer sold by Union Carbide.
[2] EEPP are those compounds No. 1, 6, 7, 9 and 12.
[3] Polyisocyanate "Mondur MR"—a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

EXAMPLE VII

A composition is also obtained by adding one of the indicated EEPP compounds in an amount sufficient to be about 10% by weight based on the weight of the total solids content of a 10% benzene solution of a 72:28 molar ratio styrene-acrylonitrile copolymer. The benzene is distilled off yielding a polymeric composition. The added EEPP compounds are those heretofore described as Nos. 1, 3, 5, 6, 10, 12, 13 and 14.

EXAMPLE VIII

To a polymer blend of an unsaturated polyester prepared by condensing one mol of an indicated EEPP, ½ mol of maleic anhydride, ½ mol of phthalic anhydride and 2.1 mols of propylene glycol to an acid number of about 40 to 200° C., cooling the mixture and dissolving the mixture in a sufficient amount of styrene monomer so that the resulting mixture comprises 30 parts styrene monomer to 70 parts of polyester, there is added a small amount (3% w./w.) of benzoyl peroxide and the resulting mixture is polymerized at 80° C. yielding a thermosetting resin. The added EEPP componnds are those heretofore described as compound Nos. 2, 4, 6, 8, and 11.

EXAMPLE IX

To a granular blend of a polystyrene and butadiene-styrene copolymer containing about 6% by weight of the copolymer there is added one of the indicated EEPP compounds in an amount of about 4% by weight by blending for 15 minutes in a tumbling type laboratory blender and then extruding the blend into rods. The added EEPP compounds are those heretofore described as compound Nos. 1, 5, 11, 13 and 14.

EXAMPLE X

To melted samples of a natural high molecular weight low density polyethylene having a density of about 0.9, a melt index of about 0.3 gm./10 min., a softening temperature of about 105° C., and a tensile strength (ultimate) of 2300 p.s.i.g., various amounts of one of the indicated EEPP sufficient to make compositions wherein the added EEPP comprises from about 4 to 8% of the total weight of the composition are added. The samples are cooled to room temperature to provide polymer compositions. The added EEPP compounds are those heretofore described as compound Nos. 3, 7, 8, 9 and 10.

EXAMPLE XI

To a 5% solution of a polyvinyl formal in ethylene dichloride there is added one of the indicated EEPP compounds in a quantity which is about 20% by weight of the total solids content of the solution. Films are cast from such solutions and then air dried for about 24 hours. The added EEPP compounds are those heretofore described as compound Nos. 1, 4, 10, 13 and 15.

EXAMPLE XII

Improved films are also obtained when one of the indicated EEPP compounds is added to a 10% solution of a 50:50 molar ratio styrene-methyl methacrylate copolymer in benzene in an amount sufficient to be about 30% by weight of the total solids content and then cast into films which are flexible. The added EEPP compounds are those heretofore described as compound Nos. 2, 3, 5, 8, and 14.

EXAMPLE XIII

With about 3 parts of a commercially available condensation product of linoleic acid and a polyamine having an amine value of from 290–320 and a viscosity of 80–120 poises at 40° C., there is mixed 7 parts of diglycidyl ether of Bisphenol A and a sufficient amount of one of the indicated EEPP to make a composition having about 16% by weight, based on the weight of the total composition, of the EEPP. The resulting reaction mixture is poured into a small aluminum pan (coated with a silicone grease to prevent sticking) and heated in an oven at 100° C. for about 2 hours. After cooling to room temperature an epoxy resinous product is obtained. The added EEPP compounds are those Nos. 1, 6, 7, 9 and 12.

EXAMPLE XIV

To samples of a commercial cellulose acetate butyrate having an average acyl content of 13% and 37% butyryl and a viscosity range of 17–33 seconds (64–124 poises) as determined by ASTM method D–1343–54T (which is incorporated herein by reference) in the solution described as Formula A, ASTM method D–871–54T (which is incorporated herein by reference) are blended on hot mill rolls a sufficient amount of one of the indicated EEPP such that the final compositions contain from about 10 to 15% by weight of the added EEPP. After blending the samples are cooled to room temperature to obtain a polymeric composition. The added EEPP are those heretofore described as compound Nos. 4, 7, 8, 10, 11 and 15.

EXAMPLE XV

To a 10% ethylene dichloride solution of polyvinyl acetate there is added one of the indicated EEPP compounds in a quantity which is ½ by weight to that of the polyvinyl acetate present in the solution. Films cast from the resulting mixture are flexible. The added EEPP compounds are those heretofore described as compound Nos. 1, 3 and 11.

EXAMPLE XVI

To melted samples of a commercial rigid polymethyl methacrylate polymer there is blended on hot mill rolls one of the indicated EEPP in an amount sufficient to provide about 20% of the EEPP per total weight of the composition. The samples are milled into sheets in order to obtain polymeric compositions. The added EEPP are those heretofore described as compound Nos. 4, 5, 6, 10, 13 and 14.

EXAMPLE XVII

To 100 parts of a polyvinyl chloride resin there is added 50 parts of dioctyl phthalate and 50 parts of $$H_2C\overset{\overset{O}{\frown}}{\text{———}}C[PO_3(C_2H_5)_2]_2$$

The mixture is placed on hot mill rolls and blended. When thoroughly blended, the product is stripped from the rolls and pressed into square shaped pieces which are soft pliable plastic.

EXAMPLE XVIII

A salt is prepared from hexamethylene diamine and adipic acid by mixing about 144 parts of amine with about 150 parts of the acid in the presence of 1300 parts of 95% ethyl alcohol and 210 parts of water. The mass is warmed until complete solution occurs and then cooled to obtain crystals of hexamethylene diammonium adipate. To this salt is added about 16 parts of $$[(C_2H_5)_2O_3P]_2C\overset{\overset{O}{\frown}}{\text{———}}C[PO_3(C_2H_5)_2]_2$$

and the mixture heated for about three hours with an equal weight of mixed xylenols (B.P. 218–222° C.) and the entire reaction mass is then poured gradually with stirring into a large volume of ethyl alcohol. The modified polyamide precipitates as granular powder and is filtered, washed with alcohol and dried.

EXAMPLE XIX

The various organic compositions prepared in the aforegoing Examples I through XVIII and which contain the novel epoxy ethane polyphosphonates (EEPP) are each individually subjected to the burn test, ASTM–D1692–D59T, heretofore descrbed. In all cases, the organic compositions are found to either demonstrate no evidence of burning or to be "self-extinguishing." The same organic compositions which do not contain the EEPP are utilized as the control materials and are tested in the same manner. These "control materials" are found in all cases to either burn or go beyond the "second gauge line," i.e. they do not exhibit "self-extinguishing" characteristics as defined by said test. Thus the utility of the present invention compositions is vividly demonstrated.

EXAMPLE XX

A control polyurethane foam is prepared by heating 10 moles of trimethylolpropane with 6 moles of adipic acid to an almost nil acid number and a hydroxyl number of 504. This polyester is formed with its own prepolymer, the prepolymer being a mixture of 20% of the above polyester and 80% of toluene disocyanate. The mixture of the above two formulations is expanded with trichlorofluoromethane in the normal manner to yield a 2.5 pounds per cubic foot density foam. The fire resistance of this foam, measured by the American Society for Testing Materials D-757 Test (which is incorporated herein by reference), is found to be about 10 inches per minute.

The polyurethane foam formulation described immediately above is again prepared; however, 7.5% by weight of the EEPP compound having the formula $$H_2C\overset{\overset{O}{\frown}}{\text{—}}C[PO_3(C_2H_5)_2]_2$$

is added. The fire resistance of the final urethane foam is measured by the ASTM D-757 test indicated above. The results of this test show the fire resistance of the foam is less than about 0.5 inch per minute.

What is claimed is:

1. A copolymer which comprises the reaction product formed by heating polyurethane and an epoxy ethane polyphosphonate having the formula $$\begin{array}{c} H_5C_2O-\overset{O}{\overset{\|}{C}} \\ H_5C_2O-\overset{O}{\overset{\|}{C}} \end{array} \overset{O}{\underset{C}{\diagdown}}\overset{}{\underset{C}{\diagup}} \begin{array}{c} \overset{O}{\overset{\|}{P}}-OC_2H_5 \\ OC_2H_5 \\ \overset{O}{\overset{\|}{P}}-OC_2H_5 \\ OC_2H_5 \end{array}$$

for a sufficient period of time to form said reaction product.

2. The composition as set forth in claim 1 wherein said polyphosphonate is present in an amount of from about 2% to about 25% by weight, based on the total weight of the polyurethane.

3. The composition as set forth in claim 2 wherein the polyurethane is a reaction product of a diisocyanate and a polyester which is prepared from a polycarboxylic acid and a polyhydric alcohol.

4. The composition as set forth in claim 2 wherein the polyurethane is a reaction product of a diisocyanate and a polyhydric polyalkylene ether having at least two hydroxy groups.

5. The composition as set forth in claim 2 wherein the polyurethane is a reaction product of a diisocyanate and a polythioether glycol.

6. The composition as set forth in claim 2 wherein the polyurethane is a reaction product of a diisocyanate and a polyesteramide.

References Cited

UNITED STATES PATENTS

| | | | |
|---|---|---|---|
| 3,092,651 | 6/1963 | Friedman | 260—461 |
| 3,471,552 | 10/1969 | Budnick | 260—502.4 |
| 3,515,776 | 6/1970 | Baranauckas | 260—927 |

FOREIGN PATENTS

| | | | |
|---|---|---|---|
| 1,537,037 | 8/1968 | France | 260—77.5 AR |

M. J. WELSH, Primary Examiner

H. S. COCKERAM, Assistant Examiner

U.S. Cl. X.R.

260—2 EP, BP, 2 P, 2.5 AJ, 2.5 AV, 13, 18 N, 18 R, 19 N, 45.7, 46.5 E, 47 R, 47 XA, 67 UA, 67.7, 68, 75 P, 77.5 AR, 77.5 D, 78 R, 78.3, 80 PS, 82.3, 83.5, 83.7, 85.3, 85.5, 86.3, 88.1, 88.3, 88.5, 88.7, 89.1, 89.7, 91.1, 91.3, 92.1, 92.8, 93.1, 93.5, 93.7, 112 R, 858 859, 879, 880, 886, 887, 888, DIG. 24